(12) United States Patent
Born et al.

(10) Patent No.: US 10,174,538 B2
(45) Date of Patent: Jan. 8, 2019

(54) FIXING DEVICE

(71) Applicant: STABILUS GmbH, Koblenz (DE)

(72) Inventors: Frank Born, Lahnstein (DE); Gerd Mülhöfer, Laubach (DE)

(73) Assignee: Stabilus GmbH, Koblenz (DE)

( * ) Notice: Subject to any disclaimer, the term of this patent is extended or adjusted under 35 U.S.C. 154(b) by 0 days.

(21) Appl. No.: 15/582,185

(22) Filed: Apr. 28, 2017

(65) Prior Publication Data

US 2017/0314312 A1    Nov. 2, 2017

(30) Foreign Application Priority Data

May 2, 2016    (DE) .................. 10 2016 108 149

(51) Int. Cl.
*E05F 5/10* (2006.01)
*F15B 15/06* (2006.01)
(Continued)

(52) U.S. Cl.
CPC ............... *E05F 5/10* (2013.01); *E05C 17/28* (2013.01); *F15B 15/06* (2013.01); *F15B 15/149* (2013.01); *F15B 15/1461* (2013.01); *F15B 15/22* (2013.01); *E05F 3/04* (2013.01); *E05Y 2201/212* (2013.01); *E05Y 2201/218* (2013.01); *E05Y 2900/132* (2013.01); *E05Y 2900/20* (2013.01); *E05Y 2900/531* (2013.01); *F16F 9/16* (2013.01); *Y10T 16/61* (2015.01)

(58) Field of Classification Search
CPC ....... E05F 5/10; E05F 5/02; E05F 5/06; E05F 3/04; E05F 3/12; E05F 3/108; F15B 15/06; F15B 15/1461; F15B 15/149; F15B 15/22; E05Y 2201/212; E05Y 2201/218; E05Y 2900/132; E05Y 2900/20; E05Y 2900/531; E05C 17/04; E05C 17/203; E05C 17/28; Y10T 16/276; Y10T 16/2782; Y10T 16/2788; Y10T 16/531; F16F 9/16
USPC ....... 16/82, 51, 58, 56; 49/137; 292/DIG. 19
See application file for complete search history.

(56) References Cited

U.S. PATENT DOCUMENTS

| 1,444,032 A | 2/1923 | Mobbs |
| 1,794,477 A | 3/1931 | Sodergren |

(Continued)

FOREIGN PATENT DOCUMENTS

| DE | 1459149 | 7/1969 |
| DE | 36 42 442 | 8/1987 |

(Continued)

*Primary Examiner* — William L Miller
(74) *Attorney, Agent, or Firm* — Cozen O'Connor

(57) ABSTRACT

A fixing device for fixing a second component part at a stationary first component part to be swivelable around a swiveling axis 2 having a cylinder that is displaceable transverse to the swiveling axis and filled with a fluid, a piston displaceably guided in the cylinder that divides the interior of the cylinder into a first working chamber and a second working chamber, with a first valve device that connects the first working chamber to the second working chamber when pressure in the first working chamber is higher than the pressure in the second working chamber, and a second valve device that connects the second working chamber to the first working chamber when pressure in the second working chamber is higher than the pressure in the first working chamber.

11 Claims, 4 Drawing Sheets

(51) Int. Cl.
  *F15B 15/14*   (2006.01)
  *F15B 15/22*   (2006.01)
  *E05C 17/28*   (2006.01)
  *E05F 3/04*    (2006.01)
  *F16F 9/16*    (2006.01)

(56) References Cited

U.S. PATENT DOCUMENTS

| | | | | |
|---|---|---|---|---|
| 3,936,977 | A * | 2/1976 | Runft | E05F 15/56 |
| | | | | 49/137 |
| 4,419,786 | A * | 12/1983 | Surko, Jr. | E05F 3/22 |
| | | | | 16/51 |
| 5,832,562 | A * | 11/1998 | Luca | E05C 17/30 |
| | | | | 16/49 |
| 7,237,471 | B2 | 7/2007 | Mintgen et al. | |
| 7,886,407 | B2 * | 2/2011 | Resnik | E05D 3/16 |
| | | | | 16/286 |
| 7,971,316 | B2 * | 7/2011 | Copeland, II | E05F 3/12 |
| | | | | 16/79 |
| 8,225,458 | B1 * | 7/2012 | Hoffberg | E05F 3/102 |
| | | | | 16/49 |
| 2001/0007163 | A1 * | 7/2001 | Alonso | E05F 3/108 |
| | | | | 16/58 |
| 2017/0089417 | A1 | 3/2017 | Pecar et al. | |

FOREIGN PATENT DOCUMENTS

| | | |
|---|---|---|
| DE | 100 01 424 | 7/2000 |
| DE | 10 2014 106 401 | 11/2015 |
| EP | 2952775 | 12/2015 |
| GB | 2526828 | 12/2015 |
| JP | 2015-031111 | 2/2015 |

\* cited by examiner

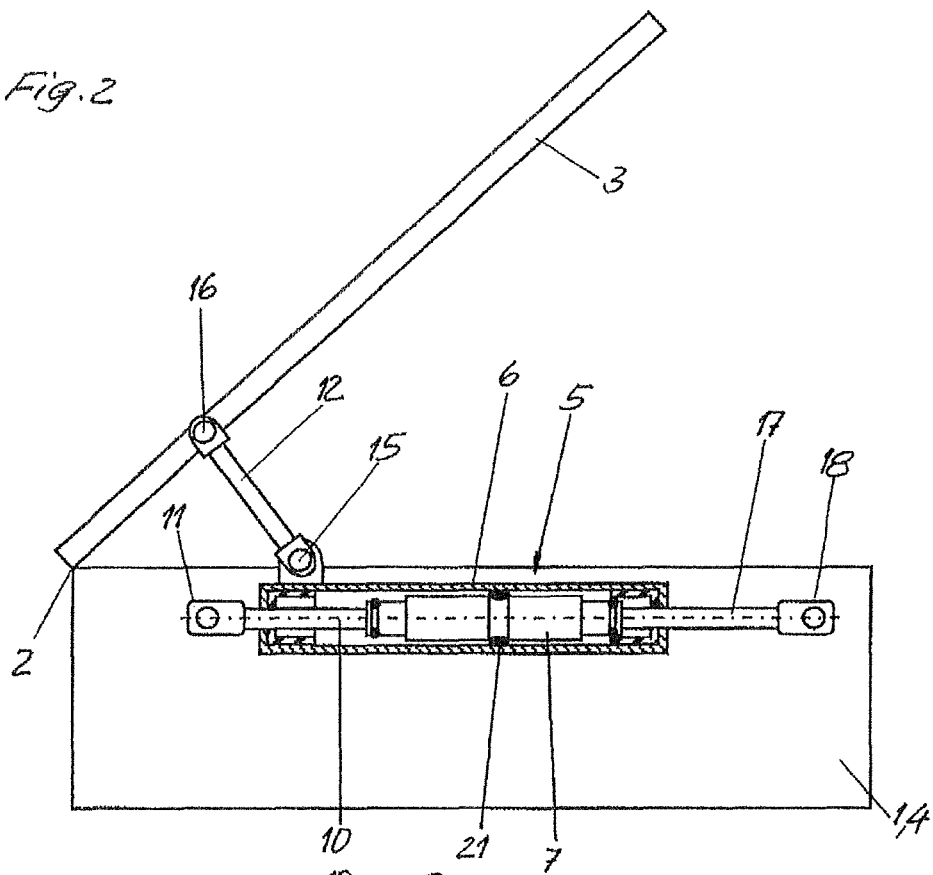
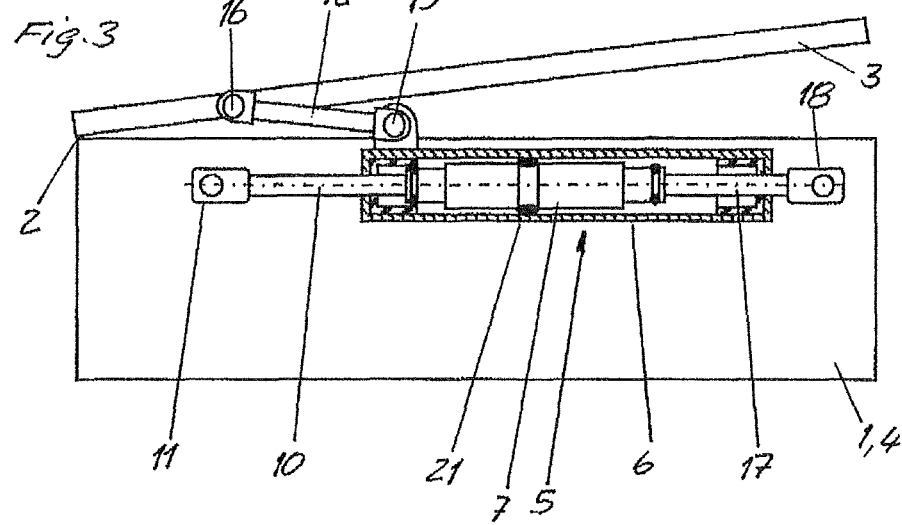

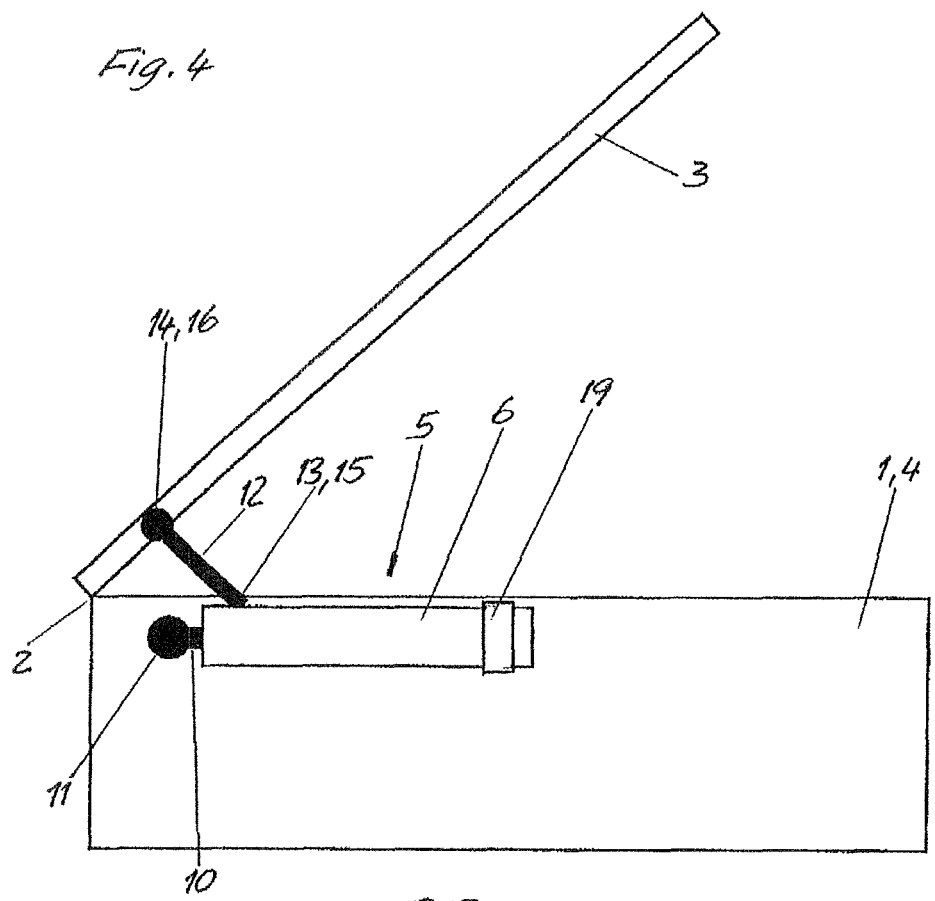
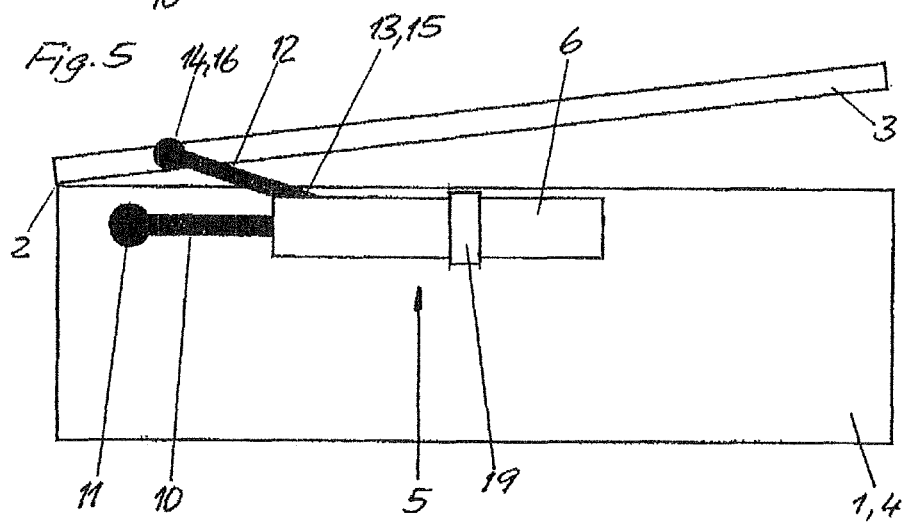

FIXING DEVICE

BACKGROUND OF THE INVENTION

1. Field of the Invention

The invention is directed to a fixing device for the continuous fixing of a second component part which is articulated at a stationary first component part so as to be swivelable around a swiveling axis, with a cylinder guided at the first component part or at the second component part so as to be displaceable transverse to the swiveling axis, the cylinder being filled with a fluid and closed at both of its ends, a piston being displaceably guided in the cylinder that divides the interior of the cylinder into a first working chamber and a second working chamber, a first valve device through which the first working chamber is connectible to the second working chamber when pressure in the first working chamber is higher than the pressure in the second working chamber, a second valve device through which the second working chamber is connectible to the first working chamber when pressure in the second working chamber is higher than the pressure in the first working chamber, and a piston rod arranged at the piston that is guided outward through the first working chamber or through the second working chamber and sealed and fastened to the first component part or to the second component part by its outwardly projecting free end.

2. Description of the Related Art

In fixing devices of this kind, it is known to articulate the piston rod by its free end projecting from the cylinder at the stationary first component part and the cylinder by its end opposite the piston rod or to articulate the free end of a second piston rod to the swivelable second component part, which second piston rod is guided out of the cylinder opposite the first piston rod and is connected to the piston.

Fixing devices of this kind require a large swiveling area over which the cylinder swivels and accordingly substantially impede free access to the stationary component part when the second component part is swiveled open.

SUMMARY OF THE INVENTION

It is an object of one aspect of the invention to provide a fixing device that can be produced in a simple and inexpensive manner, is less susceptible to wear, and has a reduced swiveling area over which the cylinder swivels.

According to one aspect of the invention in that the first end of a push-pull rod is articulated at the cylinder arranged at the first component part so as to extend transverse to the swiveling axis, the second end of the push-pull rod being articulated at the second component part at a distance from the swiveling axis, or in that the second end of a push-pull rod is articulated at the cylinder arranged at the second component part so as to extend transverse to the swiveling axis, the first end of the push-pull rod being articulated at the first component part at a distance from the swiveling axis.

During a swiveling movement of the second component part, the piston rod remains at least substantially in its position relative to the first component part or second component part at which it is arranged, while the cylinder is only displaced but not swiveled on the piston rod by the push-pull rod.

The free end of the piston rod and the second end of the push-pull rod are preferably articulated in the area of the first component part or second component part in proximity to the swiveling axis.

This results in a particularly small swiveling area over which the push rod swivels.

The cylinder preferably extends at right angles to the swiveling axis and the push-pull rod extends so as to be inclined to the longitudinal axis of the cylinder by an angle diverging from a right angle.

In a simple, trouble-free construction, the first valve device and/or the second valve device can be check valve devices which are acted upon by spring force.

If only the one piston rod is present and the cylinder is axially moveably guided on the piston rod by its one end area, it is advantageous when the cylinder is axially guided at a distance from this guide at a further guide. For example, this could be a guide bushing fastened to the component part to which the piston rod is fastened.

If a first piston rod, which is guided outward through the first working chamber, sealed. and fastened by its outwardly projecting free end to the first component part or second component part, is arranged at the piston and if a second piston rod guided outward through the second working chamber, sealed, and fastened by its outwardly projecting free end to the first component part or second component part is arranged at the piston, the cylinder is displaceably guided exclusively on the two piston rods and does not require a further guide, e.g., a guide bushing.

To prevent a hard impact of the piston at the end closure of the cylinder, at the end of a stroke movement of the piston rod relative to the cylinder, the end area of the stroke movement of the first piston rod and/or of the second piston rod can be damped in push-out direction by a damping device.

To this end, in a simple configuration, the end area or both end areas of the cylinder can have a reduced cylindrical cross section, and a coaxial piston shoulder arranged in the vicinity of the piston is located opposite each end area of reduced cylindrical cross section and can penetrate into the end area of reduced cylindrical cross section associated with it, and the outer diameter of the piston shoulder is equal to or less than the inner diameter of the end area of reduced cross section associated with it.

The radially circumferentially extending lateral surfaces of the piston shoulders preferably have radially circumferentially extending annular grooves in which are arranged elastic sealing rings that project radially out of the annular grooves and have outer diameters corresponding to the inner diameter of the end areas of reduced diameter.

The piston rod or the first piston rod and the second piston rod can be guided outward from the interior of the cylinder in a sealed manner through guiding and sealing units.

The second component part can be a door or a hatch.

The door or hatch can be swivelable around a horizontal swiveling axis or around a vertical swiveling axis. A door can be, e.g., a house door, a furniture door, or a vehicle door. The hatch can be, e.g., a hatch in a piece of furniture or a hatch in a vehicle such as a rear hatch. The hatch can also be formed as a window.

The cylinder is preferably filled with a hydraulic fluid so that the stationary second component part is held in a particularly stable manner with respect to position. However, it is also possible that the cylinder is filled with a pneumatic fluid.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Embodiment examples of the invention are shown in the drawing and are described in more detail in the following. In the drawings:

FIG. 2 is the fixing device according to FIG. 1 at a frame and a door in open position;

FIG. 3 is the fixing device according to FIG. 1 at a frame and a door in ajar position;

FIG. 4 is a fixing device at a frame and a door in open position;

FIG. 5 is the fixing device according to FIG. 4 at a frame and a door in ajar position.

DETAILED DESCRIPTION OF THE PRESENTLY PREFERRED EMBODIMENTS

Figure 1:
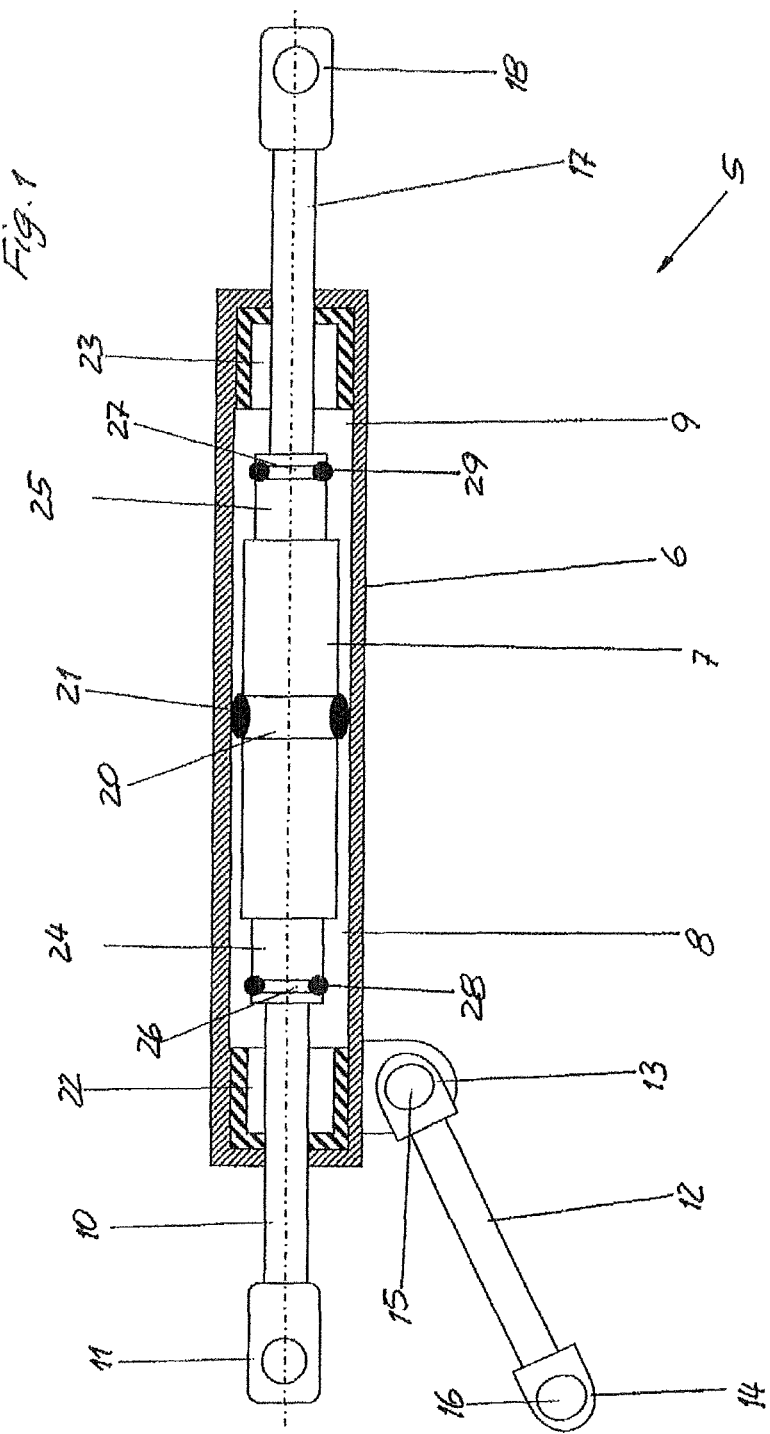
FIG. 1 is an example of a fixing device in longitudinal direction.

The devices shown in the figures have, as stationary first component part, a door frame 1 on one side of which a door 3, as second component part, is articulated so as to be swivelable around a vertical swiveling axis 2.

A fixing device 5, which has a cylinder 6 is closed at its ends and extends parallel to the longitudinal extension of the frame part 4 is fastened to a horizontal frame part 4 of the door frame 1 that extends longitudinally at right angles to the swiveling axis 2.

A piston 7, which divides the interior of the cylinder 6 filled with a hydraulic liquid into a first working chamber 8 and a second working chamber 9, is displaceably arranged in the cylinder 6.

Figure 6:
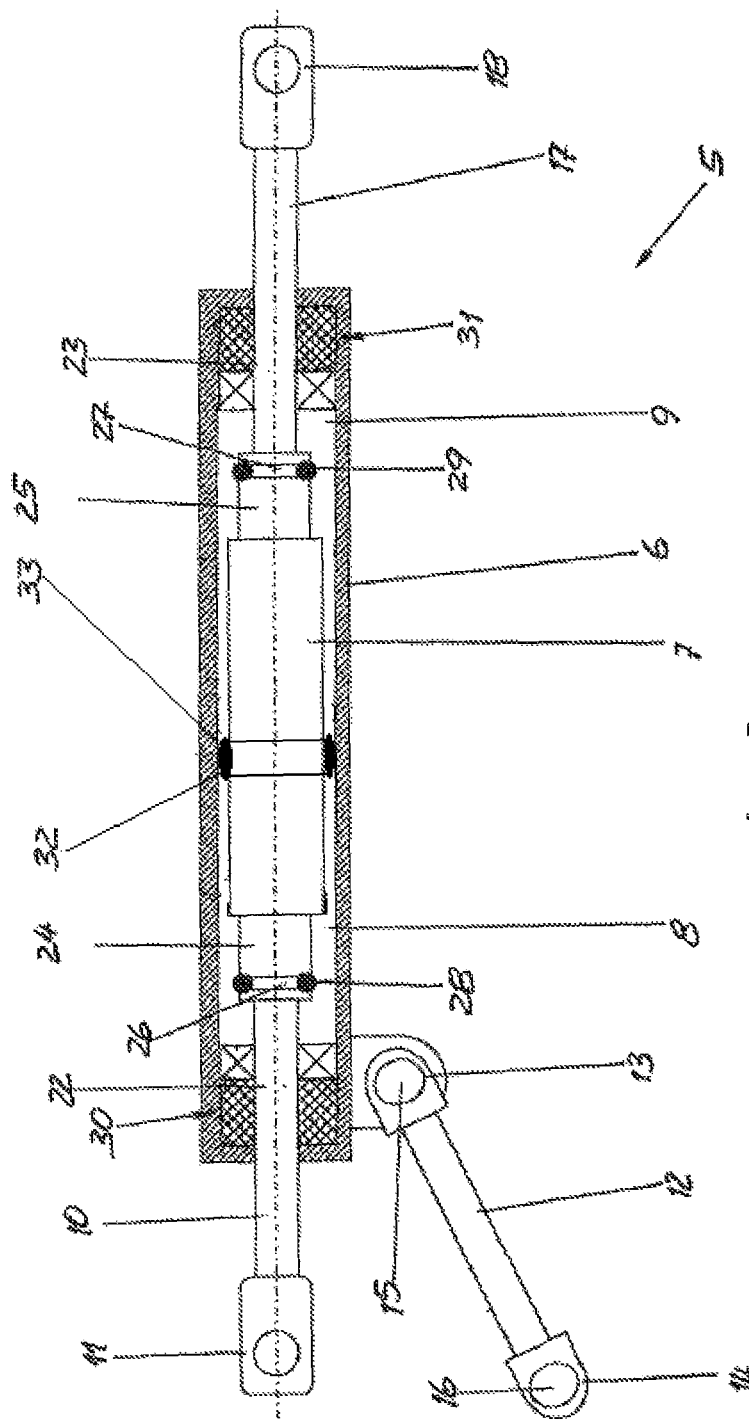
FIG. 6 is an example of a fixing device in longitudinal direction.

Fastened to a piston 7 is a first piston rod 10 guided through the first working chamber 8 and guided outward out of the first working chamber 8 through a first guiding and sealing unit 31 shown in FIG. 6. The first piston rod 10 is fastened to the frame part 4 by its outwardly projecting free end 11.

A first end 13 of a push-pull rod 12 is articulated at the end area of the cylinder 6 closer to the swiveling axis 2 so as to be swivelable around a first articulation axis 15 parallel to the swiveling axis. The second end 14 of the push-pull rod 12 inclined relative to the cylinder 6 at the side of the swiveling axis 2 so as to diverge from a right angle is articulated at the door 3 at a distance from the swiveling axis 2 to be swivelable around a second articulation axis 16 parallel to the swiveling axis 2.

The embodiment in FIGS. 1, 2, and 3 has a second piston rod 17 fastened to the piston 7 and guided through the second working chamber 9 opposite to the first piston rod 10 and projects outward out of the second working chamber 9 through a second guiding and sealing unit 30 shown in FIG. 6. The second piston rod 17 is fastened to the frame part 4 by its outwardly projecting free end 18.

The cylinder 6 is guided on the two piston rods 10 and 17 to be displaceable relative to the longitudinal extension of the frame part 4.

In the embodiment example in FIGS. 4 and 5, a guide bushing 19 surrounding the cylinder 6 is fastened to the frame part 4, the cylinder being guided in the guide bushing 19 to be displaceable relative to the longitudinal extension of the frame part 4.

The construction in the interior of the cylinder 6 is identical in both embodiments with the exception that the embodiment example in FIGS. 1 to 3 has two piston rods 10 and 17 and the embodiment example in FIGS. 4 and 5 has only one piston rod 10.

The radially circumferentially extending lateral surface of the piston 7 has in its middle area a radially circumferentially extending annular groove 20 in which is arranged an elastic ring 21 that contacts the inner wall of cylinder 6 by its area projecting out of the annular groove 20.

The two working chambers 8 and 9 are separated from one another by the ring 21 and the piston 7. Further, ring 21 represents a first valve device through which the first working chamber 8 can be connected to the second working chamber 9 when the pressure in the first working chamber 8 is higher than the pressure in the second working chamber 9 and a second valve device through which the second working chamber 9 can be connected to the first working chamber 8 when the pressure in the second working chamber 9 is higher that the pressure in the first working chamber 8. As shown in FIG. 6, the two valve devices are a first check valve device 32 and a second valve device 33. The first valve device 32 and the second valve device 33 are acted upon by a spring force.

A higher pressure in a working chamber 8 or 9 arises in that force is applied to the door manually in swiveling direction. As a result of the corresponding valve device being opened, hydraulic liquid overflows from one working chamber 8, 9 to the other working chamber 8, 9. When the application of manual force to the door ceases, the valve device closes again and the door is held in its occupied position by the fixing device.

In the embodiment example in FIGS. 4 and 5, the end area 23 of the cylinder 6 farther away from the swiveling axis 2 has a reduced cylindrical cross section, and in the embodiment example in FIGS. 1 to 3 the two end areas 22 and 23 of the cylinder 6 have a reduced cylindrical cross section. A coaxial piston shoulder 24, 25 arranged in proximity to the piston 7 is located opposite each reduced cylindrical cross section. In the respective end stroke of piston 7, this piston shoulder 24, 25 penetrates into the reduced cylindrical cross section associated with it, the outer diameter of the piston shoulder 24, 25 being somewhat smaller than the inner diameter of the end area 22, 23 of reduced cross section associated with it.

The radially circumferentially extending lateral surfaces of the piston shoulders 24, 25 have radially circumferentially extending annular grooves 26, 27 in which are arranged elastic sealing rings 28, 29 which project radially out of the annular grooves and contact the inner walls of the end areas 22, 23 of reduced cross section.

The movement of the cylinder 6 is damped in its end stroke by the piston shoulders 24, 25 penetrating into the end areas 22, 23 of reduced cross section associated with them.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A fixing device configured to continuously fix a second component part that is articulated at a stationary first component part to be swivelable around a swiveling axis, comprising:
   a cylinder closed at both of its ends and filled with a fluid that is guided at one of the first component part and the second component part to be displaceable transverse to the swiveling axis;
   a piston configured to be displaceably guided in the cylinder that divides an interior of the cylinder into a first working chamber and a second working chamber;
   a first valve device configured to couple the first working chamber to the second working chamber when a pressure in the first working chamber is higher than a pressure in the second working chamber;
   a second valve device configured to couple the second working chamber to the first working chamber when the pressure in the second working chamber is higher than the pressure in the first working chamber;
   a first piston rod arranged at the piston that is guided outward and sealed through one of the first working chamber and the second working chamber and is fastened to one of the first component part and the second component part by an outwardly projecting free end;
   a push-pull rod having one of:
   a first end articulated at the cylinder arranged at the first component part so as to extend transverse to the swiveling axis and a second end of the push-pull rod being articulated at the second component part at a distance from the swiveling axis; and
   the second end of a push-pull rod is articulated at the cylinder arranged at the second component part to extend transverse to the swiveling axis and the first end of the push-pull rod being articulated at the first component part at the distance from the swiveling axis.

2. The fixing device according to claim 1, wherein the cylinder extends at right angles to the swiveling axis and the push-pull rod extends so as to be inclined to a longitudinal axis of the cylinder by an angle diverging from a right angle.

3. The fixing device according to claim 1,
   wherein at least one of the first valve device and the second valve device are check valve devices acted upon by spring force,
   wherein the spring force is provided by an elasticity of a material of the at least one of the first valve device and the second valve device.

4. The fixing device according to claim 1, wherein the first piston rod is guided outward through the first working chamber and is fastened by its outwardly projecting free end to the first component part or the second component part is arranged at the piston, and a second piston rod arranged at the piston is guided outward and sealed through the second working chamber and is fastened by its outwardly projecting free end to one of the first component part and the second component part.

5. The fixing device according to claim 4, wherein a respective end area of a stroke movement of one of the first piston rod and the second piston rod are damped in push-out direction by a damping device.

6. The fixing device according to claim 5,
   wherein at least one of the respective end areas of the cylinder forming the damping device have a reduced cylindrical cross section,
   wherein a coaxial piston shoulder arranged proximity to the piston is located opposite each end area of reduced cylindrical cross section and configured to penetrate into the end area of reduced cylindrical cross section associated with it, and
   wherein an outer diameter of the coaxial piston shoulder is equal to or less than an inner diameter of the end area of reduced cross section associated with it.

7. The fixing device according to claim 6, wherein the radially circumferentially extending lateral surfaces of the coaxial piston shoulders have radially circumferentially extending annular grooves in which are arranged elastic sealing rings which project radially out of the annular grooves and have outer diameters corresponding to the inner diameter of the end areas of reduced diameter.

8. The fixing device according to claim 4, wherein the first piston rod and the second piston rod are guided outward from the interior of the cylinder in a sealed manner through respective guiding and sealing units.

9. The fixing device according to claim 1, wherein the first component part is a door frame and the second component part is a door or a hatch.

10. The fixing device according to claim 1, wherein the fluid is a hydraulic fluid.

11. The fixing device according to claim 1, wherein the first piston rod is guided outward from the interior of the cylinder in a sealed manner through a guiding and sealing unit.

* * * * *